US011188350B2

(12) United States Patent
Blagay et al.

(10) Patent No.: US 11,188,350 B2
(45) Date of Patent: Nov. 30, 2021

(54) METHOD AND APPARATUS FOR STREAMING MAP DATA BASED ON DATA TYPES

(71) Applicant: HERE Global B.V., Eindhoven (NL)

(72) Inventors: Maxim Blagay, Berlin (DE); Ivan Lopit, Zakarpatska Obl. (UA)

(73) Assignee: HERE Global B.V., Eindhoven (NL)

( * ) Notice: Subject to any disclaimer, the term of this patent is extended or adjusted under 35 U.S.C. 154(b) by 165 days.

(21) Appl. No.: 16/684,098

(22) Filed: Nov. 14, 2019

(65) Prior Publication Data

US 2021/0149684 A1    May 20, 2021

(51) Int. Cl.
| | | |
|---|---|---|
| *G06F 15/177* | (2006.01) | |
| *G06F 9/00* | (2006.01) | |
| *G06F 9/445* | (2018.01) | |
| *H04L 29/08* | (2006.01) | |
| *G06F 16/2455* | (2019.01) | |
| *G06F 16/22* | (2019.01) | |
| *G06F 9/4401* | (2018.01) | |

(52) U.S. Cl.
CPC ........ *G06F 9/44505* (2013.01); *G06F 9/4401* (2013.01); *G06F 16/2282* (2019.01); *G06F 16/24568* (2019.01); *H04L 67/1095* (2013.01); *H04L 67/1097* (2013.01)

(58) Field of Classification Search
CPC ........... G06F 9/44505; G06F 16/24568; G06F 16/2282; G06F 9/4401; H04L 67/1097; H04L 67/1095; H04L 65/4084; H04L 65/80; H04L 65/602; G01C 21/3881; H04N 21/23109; H04N 21/41422; H04N 21/6587; H04N 21/2393; H04N 21/4728; G08G 1/00
See application file for complete search history.

(56) References Cited

U.S. PATENT DOCUMENTS

| | | |
|---|---|---|
| 6,680,919 B1 | 1/2004 | Rauhala |
| 7,962,281 B2 | 6/2011 | Rasmussen et al. |

(Continued)

OTHER PUBLICATIONS

Anonymous, "Map Data On-demand Innovation in NDS Map Streaming as a Service", Navigation Data Standard, Aug. 14, 2019, retrieved from https://nds-association.org/map-data-on-demand/, pp. 1-2.

*Primary Examiner* — Xuxing Chen
(74) *Attorney, Agent, or Firm* — Ditthavong, Steiner & Mlotkowski

(57) ABSTRACT

An approach is provided for streaming map data based on data types. For example, the approach involves receiving a request to initiate a streaming of a mapping database to a client device. The mapping database includes at least one original data block including data records corresponding to tiles. The approach also involves processing the data records to generate data bundle entries for an after-processing bundle block. Each of the data bundle entries corresponds to a subset of the tiles, and the after-processing bundle block includes a bundle file and a bundle index file. The approach further involves selecting one of the data bundle entries based on a tile of interest in the request. The approach further involves generating a mapping data stream based on the selected data bundle entry. The approach further involves initiating the streaming of the content data in response to the request.

20 Claims, 11 Drawing Sheets

(56) References Cited

U.S. PATENT DOCUMENTS

| | | |
|---|---|---|
| 10,255,293 B2 | 4/2019 | Zhu et al. |
| 10,664,518 B2 * | 5/2020 | McKinnon .............. G06F 16/50 |
| 2007/0143017 A1 | 6/2007 | Reich |
| 2008/0059889 A1 * | 3/2008 | Parker ..................... G06F 16/29 |
| | | 715/748 |
| 2011/0004828 A1 * | 1/2011 | Callicrate ............ G09B 29/007 |
| | | 715/738 |
| 2012/0131025 A1 * | 5/2012 | Cheung ............... G06F 16/1752 |
| | | 707/755 |
| 2012/0166401 A1 * | 6/2012 | Li ....................... G06F 16/2246 |
| | | 707/692 |

* cited by examiner

METHOD AND APPARATUS FOR STREAMING MAP DATA BASED ON DATA TYPES

BACKGROUND

Modern applications (e.g., navigation applications) often rely on structured databases for performing all kinds of functions (e.g., navigation or mapping functions such as map display, routing, and location searching). While managing and updating these structured databases (e.g., map databases) can be straightforward on a server/cloud infrastructure, edge devices such as mobile phones and infotainment units have resource limitations, such as available communication bandwidth and on-board storage that can affect how a structured database is provided. Accordingly, service providers face significant technical challenges to delivering these structured databases to edge devices.

SOME EXAMPLE EMBODIMENTS

Therefore, there is a need for an approach for streaming map or other structured data based on data types to user devices to make efficient use of resources available at the devices and cloud infrastructure while also providing for timely access to the data and the functions which the data support. One example of a data type includes but is not limited to a meta table, wherein the client device creates a local copy of the bootstrap database structure of the meta table and fills the local copy with the bootstrap data of the meta table during a bootstrap process of the streaming of the mapping database. It is noted that the data type is provided by way of illustration and not as limitations, it is contemplated that any other data type or classification can be used according to the embodiments described herein.

According to one embodiment, a method comprises receiving a request to initiate a streaming of a mapping database to a client device. The mapping database includes at least one original data block that includes a plurality of data records corresponding to a plurality of tiles. The method also comprises processing the plurality of data records to generate a plurality of data bundle entries for an after-processing bundle block. Each of the data bundle entries corresponds to a subset of the tiles, and the after-processing bundle block includes a bundle file that includes content data of the data bundle entries and a bundle index file that includes metadata of the data bundle entries. The method further comprises selecting one of the data bundle entries based on a tile of interest in the request. The method further comprises generating a mapping data stream based on the selected data bundle entry. The method further comprises initiating the streaming of the content data of the selected data bundle entry in response to the request. The content data of the selected data bundle entry is transmitted as a data block of the mapping data stream.

According to another embodiment, an apparatus comprises at least one processor, and at least one memory including computer program code for one or more computer programs, the at least one memory and the computer program code configured to, with the at least one processor, cause, at least in part, the apparatus to receive a request to initiate a streaming of a mapping database to a client device. The mapping database includes at least one original data block that includes a plurality of data records corresponding to a plurality of tiles. The apparatus is also caused to process the plurality of data records to generate a plurality of data bundle entries for an after-processing bundle block. Each of the data bundle entries corresponds to a subset of the tiles, and the after-processing bundle block includes a bundle file that includes content data of the data bundle entries and a bundle index file that includes metadata of the data bundle entries. The apparatus is further caused to select one of the data bundle entries based on a tile of interest in the request. The apparatus is further caused to generate a mapping data stream based on the selected data bundle entry. The apparatus is further caused to initiate the streaming of the content data of the selected data bundle entry in response to the request. The content data of the selected data bundle entry is transmitted as a data block of the mapping data stream.

According to another embodiment, a non-transitory computer-readable storage medium carries one or more sequences of one or more instructions which, when executed by one or more processors, cause, at least in part, an apparatus to receive a request to initiate a streaming of a mapping database to a client device. The mapping database includes at least one original data block that includes a plurality of data records corresponding to a plurality of tiles. The apparatus is also caused to process the plurality of data records to generate a plurality of data bundle entries for an after-processing bundle block. Each of the data bundle entries corresponds to a subset of the tiles, and the after-processing bundle block includes a bundle file that includes content data of the data bundle entries and a bundle index file that includes metadata of the data bundle entries. The apparatus is further caused to select one of the data bundle entries based on a tile of interest in the request. The apparatus is further caused to generate a mapping data stream based on the selected data bundle entry. The apparatus is further caused to initiate the streaming of the content data of the selected data bundle entry in response to the request. The content data of the selected data bundle entry is transmitted as a data block of the mapping data stream.

According to another embodiment, an apparatus comprises means for receiving a request to initiate a streaming of a mapping database to a client device. The mapping database includes at least one original data block that includes a plurality of data records corresponding to a plurality of tiles. The apparatus also comprises means for processing the plurality of data records to generate a plurality of data bundle entries for an after-processing bundle block. Each of the data bundle entries corresponds to a subset of the tiles, and the after-processing bundle block includes a bundle file that includes content data of the data bundle entries and a bundle index file that includes metadata of the data bundle entries. The apparatus further comprises means for selecting one of the data bundle entries based on a tile of interest in the request. The apparatus further comprises means for generating a mapping data stream based on the selected data bundle entry. The apparatus further comprises means for initiating the streaming of the content data of the selected data bundle entry in response to the request. The content data of the selected data bundle entry is transmitted as a data block of the mapping data stream.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for streaming map data (or other structured data) based on data types are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention. Although the various embodiments are discussed with respect to a mapping or geographic database as one example of a structured database, it is contemplated that the embodiments described herein are applicable to any structured database that is to be streamed to user devices.

Figure 1:
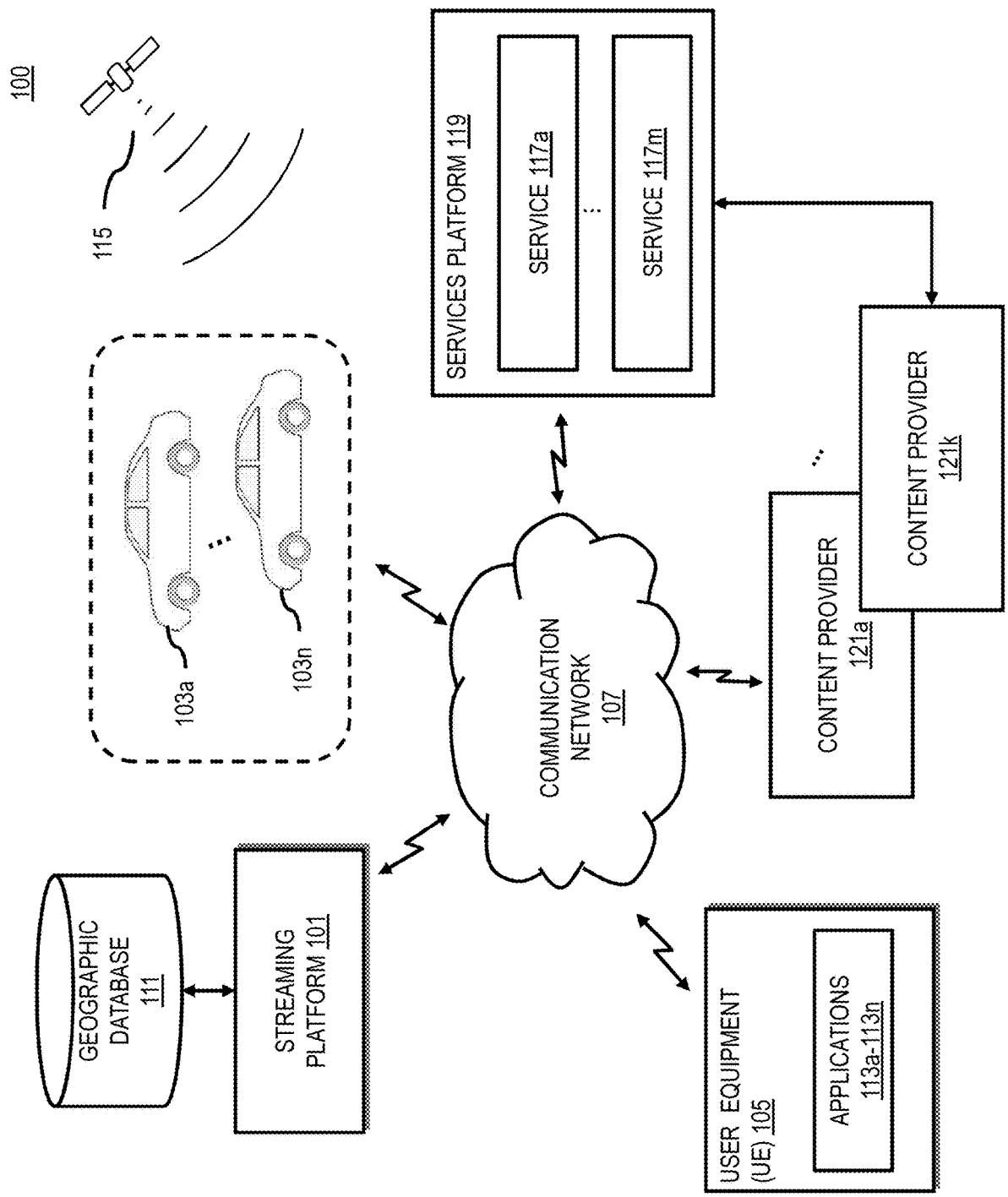
FIG. 1 is a diagram of a system capable of streaming map data based on data types, according to one embodiment.

FIG. 1 is a diagram of a system capable of streaming map data based on data types, according to one embodiment. As discussed above, applications (e.g., navigation applications) rely on structured databases for performing all kinds of navigation functions, such as map display, routing and location searching. These databases are maintained and updated on a regular basis to provide the relevant functions. Byway of example, the Navigation Data Standard (NDS) provides a structured database, which allows for selective retrieval of map data at a tile level, or enabling updates to specific geographic areas/regions, such as Germany. Both procedures function when file structures are available locally on a user device or when such file structures can be swapped/replaced over reliable and cost effective channels. However, the existing map databases, including NDS compliant databases, do not support a cold start or bootstrapping a portion of map data at a desired granularity onto a user device.

By way of example, an NDS database is compressed, so it is difficult to get a part of the database directly. Requesting data streams at an existing standard granularity (i.e. updating per region) results in large data set downloads, while most of the downloaded data will not be used. On the other hand, requesting single tiles for navigation results in high latencies, due to the longer package round trip time associated with wireless communication and significant HTTP(S)s protocol overhead.

Based on the technical challenges discussed above, the system 100 of FIG. 1 introduces a capability to process records of a database that is to be streamed to classify the data records by one or more data types or classifications. The system 100 then provides different streaming mechanisms and processes for delivering the differentially classified data records. In one embodiment where the structured is a mapping database, the system 100 can classify map data records according to their usage patterns. As discussed above, One example of a data type includes but is not limited to bootstrap data (e.g., data that is a prerequisite or otherwise marked to be available when first starting or initiating an application) and non-bootstrap data (e.g., application data that can be streamed after initial startup of the application).

In one embodiment, the system 100 provides a multi-level streaming approach for a map database or structured database provided from the server side, including a meta-table transfer mode for downloading an initial database content, a lazy-table transfer mode for downloading complete tables on demand, a building block table transfer mode for downloading tileable data, etc. Tileable data refers, for instance, to data in the database that can be geo-referenced to a specific geographic area associated with a map tile (e.g., typically a grid arrangement of a map that covers a geographic area at one or more zoom levels). Non-tileable data refers to data of the database content that, according to the usage pattern, cannot be requested by the client on demand. In other words, depending on the type of the data (e.g., bootstrap data, metadata, tileable data, non-tileable data, etc.), the system 100 can invoke a different transfer mode that is specific to the data type.

By way of example, the system 100 bundles map data by collecting several tiles into a single Bundle Entry according to defined bundle rules. When a client requests a specific tile, the system 100 retrieves the corresponding bundle entry including the tile, and transmits the entire bundle entry to the client. The bundle is created to optimize the payload use of an HTTP(S) request and provide a better user experience. For example, an individual map tile request is typically associated with an amount of overhead data that is usually not dependent on the number of tiles in a payload. Because of this, streaming on a tile-by-tile basis may result in excessive use of overhead data because each tile would use an corresponding individual HTTP(S) request. However, bundling too large of a payload with each HTTP(S) request can create larger chunks sizes that can affect system latency adversely (e.g., by having to transfer larger bundle files to deliver a requested map tile before the map tile is ready at the user device). Therefore, in one embodiment, the system 100 can balance the bundle entry sizes, streaming transfer modes, and other related factors to optimize between latency and required overhead data, among other factors.

As shown in FIG. 1, a system 100 includes a streaming platform 101 configured for distribution of hierarchical tile-based map data according to the various embodiments described. In one embodiment, the streaming platform 101 can also act as a general mapping platform to provide any other type of geographical or map data (e.g., traffic incident reports, location-based events, weather data, and/or any other reports of geotagged data) using the embodiment of the streaming based on data types approaches described herein. In one embodiment, the streaming platform 101 is part of a digital transportation infrastructure that provides for delivery of location-based and/or geotagged information to and from connected vehicles 103a-103n (also collectively referred to as vehicles 103) and/or other connected devices (e.g., user equipment (UE) 105) over a communication network 107. Although various embodiments are discussed with respect to map data organized into a tile-based hierarchical data structure that is stored, for instance, in a geographic database 111, it is contemplated that any other type of geographical data that includes or is tagged with location data (e.g., geographical coordinates) of the geographic database 111 is applicable to the various embodiments described herein.

Figure 2:
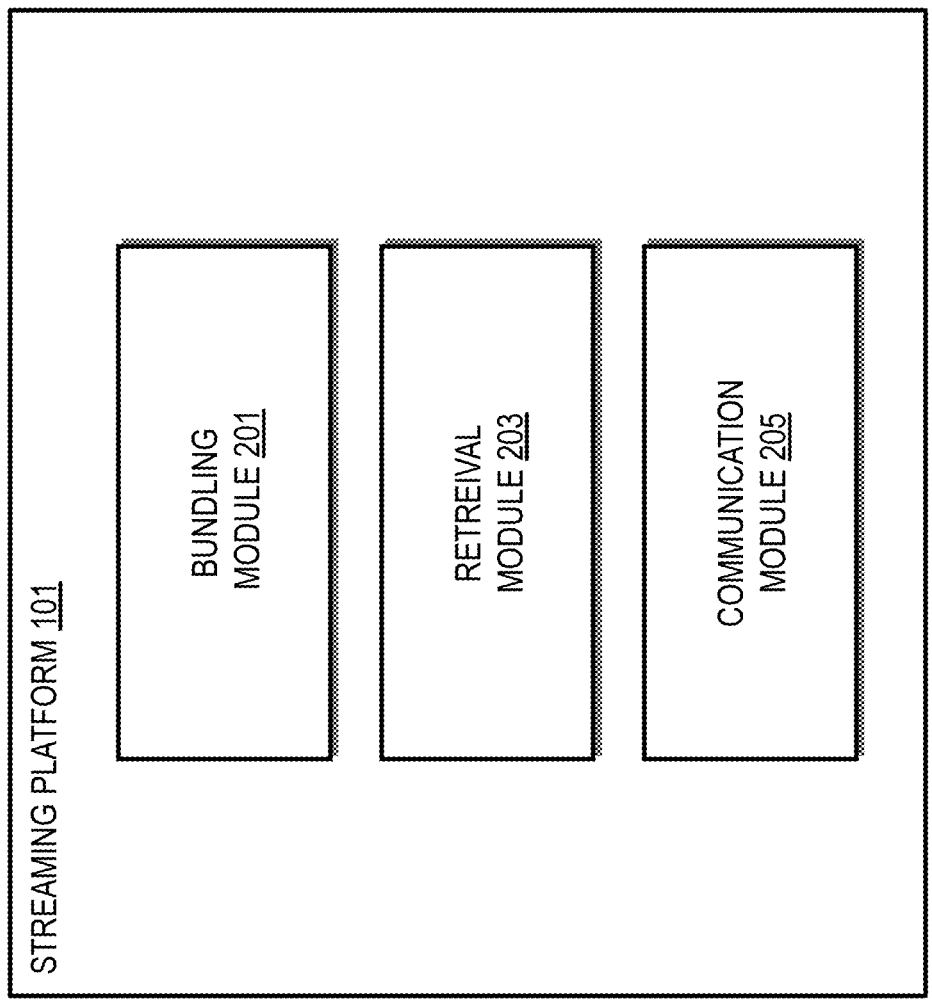
FIG. 2 is a diagram of the components of a streaming platform, according to one embodiment.

FIG. 2 is a diagram of the components of the streaming platform, according to one embodiment. By way of example, the streaming platform 101 includes one or more components for streaming map data based on data types according to the various embodiments described herein. It is contemplated that the functions of these components may be combined or performed by other components of equivalent functionality. In one embodiment, the streaming platform 101 includes a bundling module 201, a retrieval module 203, and a communication module 205. The above presented modules and components of the streaming platform 101 can be implemented in hardware, firmware, software, or a combination thereof. Though depicted as a separate entity in FIG. 1, it is contemplated that the streaming platform 101 may be implemented as a module of any of the components of the system 100 (e.g., a component of the services platform 119, the services 117a-117m of the services platform, the vehicles 103, UEs 105, etc.). In another embodiment, one or more of the modules 201-205 may be implemented as a cloud based service, local service, native application, or combination thereof. The functions of the streaming platform 101 and the modules 201-205 are discussed with respect to FIGS. 3-6 below.

Figure 3:
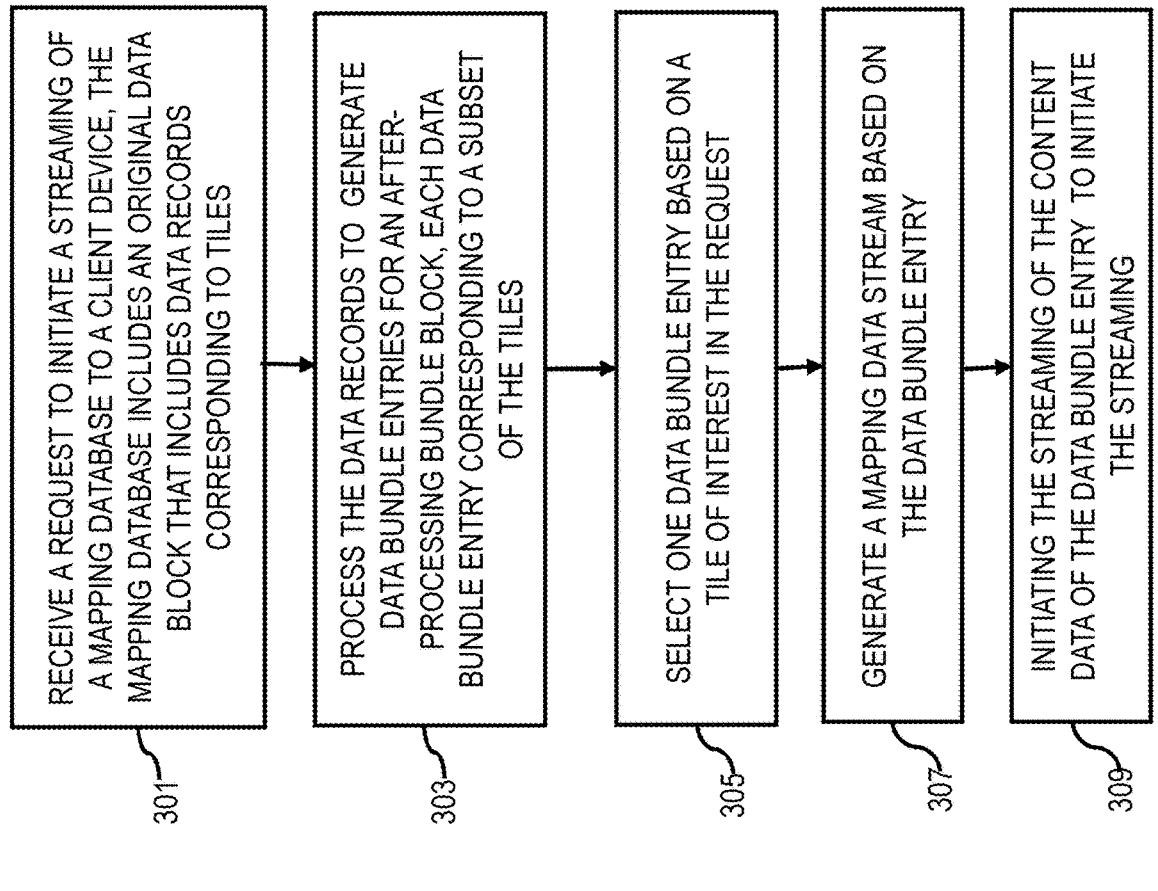
FIG. 3 is a flowchart of a process for streaming map data based on data types, according to one embodiment.
Figure 9:
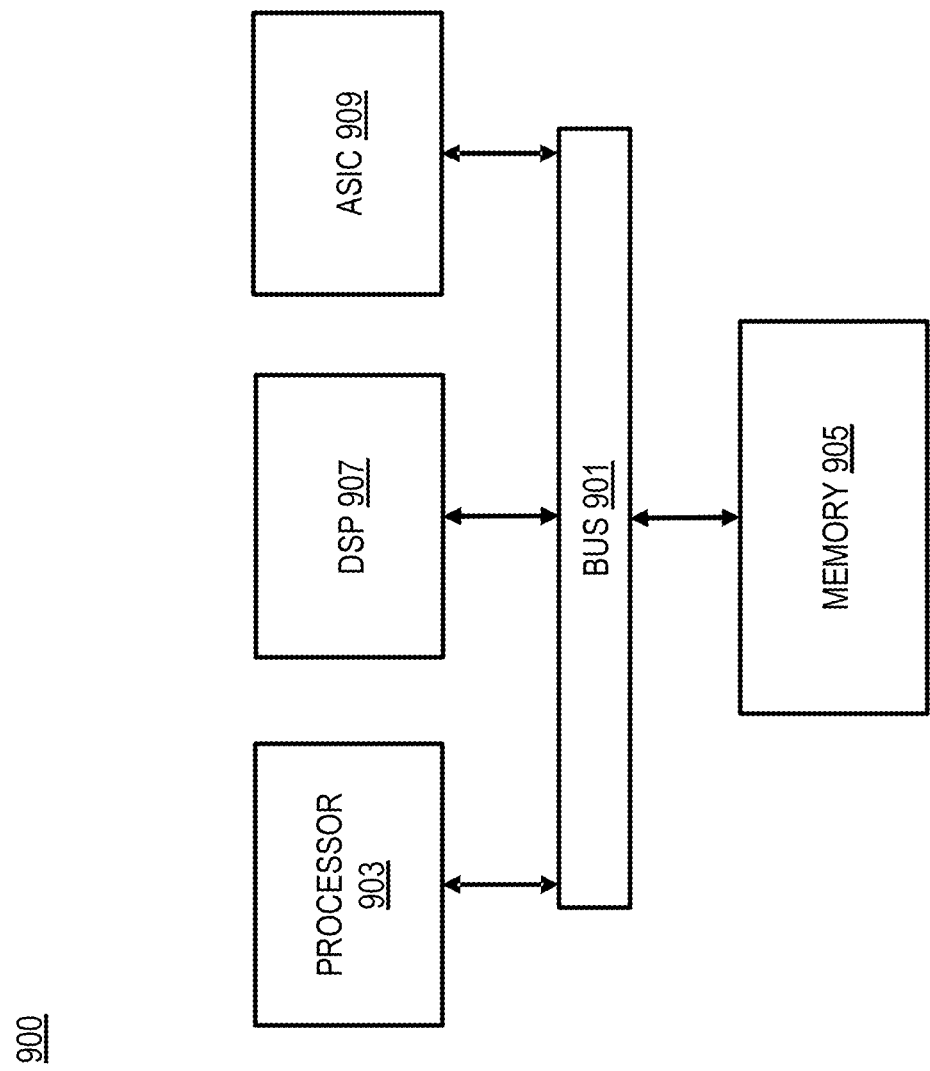
FIG. 9 is a diagram of a chip set that can be used to implement an embodiment of the invention.

FIG. 3 is a flowchart of a process for streaming map data based on data types, according to one embodiment. In various embodiments, the streaming platform 101 and/or any of the modules 201-205 of the streaming platform 101 as shown in FIG. 2 may perform one or more portions of the process 300 and may be implemented in, for instance, a chip set including a processor and a memory as shown in FIG. 9. As such, the streaming platform 101 and/or the modules 201-205 can provide means for accomplishing various parts of the process 300, as well as means for accomplishing embodiments of other processes described herein in conjunction with other components of the system 100. Although the process 300 is illustrated and described as a sequence of steps, its contemplated that various embodiments of the process 300 may be performed in any order or combination and need not include all of the illustrated steps.

In one embodiment, in step 301, the bundling module 201 receives a request to initiate a streaming of a mapping database to a client device. The mapping database includes at least one original data block that includes a plurality of data records corresponding to a plurality of tiles. By way of example, the request is directed to a NDS-compliant map database for a navigation map to a destination. The NDS database uses the SQLite Database File Format and includes product databases (e.g., Europe basic navigation product database supplied by HERE), each of which is delivered by one database supplier and divided into update regions. Each update region (e.g., Finland) can be updated incrementally and partially within the NDS database. The NDS database structure is also organized by building blocks, levels, and content. A building block addresses a specific functional aspect of navigation, such as Basic Map Display (BMD), Routing, POI, Traffic Information, Shared Data, Digital Terrain Model (DTM), Junction View, Orthoimages, 3D Objects, SLI, Full-text Speech, etc. Each data supplier can deploy its own number of building blocks for a update region, and each update region may contain data from multiple building blocks. Within a product database, which has several update regions, there may thus be several instances of the same building block. For example, in a Europe product database, there are a Basic Map Display building block in the update region "Finland" and a Basic Map Display building block in the update region "Greenland".

In one embodiment, the bundling module 201 breaks an original NDS Map into smaller chunks by using unique identifiers "Bundling Keys" including tile Ids, SQLite Ids, primary keys, etc. to archive a desired granularity. The original NDS Map is a relational database, and client applications use complex access patterns to access the NDS Map Database according to application specific performance and memory usage goals. The bundling module 201 defines a minimal map chunk as a SQLite row or a Bundle Row. The plurality of data rows is a plurality of data rows of one or more data tables of the mapping database, and wherein the classifying of said each data record is performed with respect to each row of the plurality of data rows. The bundling module 201 generates a bundle index that correlates to the bundle block.

In one embodiment, the bundling module 201 processes the plurality of data records (e.g., NDS building blocks) to classify each data record of the plurality of data records. Depending on the original NDS map content and usage patterns, the bundling module 201 deploys the following bundling strategies for SQLite tables in NDS building blocks. The bootstrap data is required for a bootstrapping process on a client device, and the non-bootstrap data includes actual map content data to be streamed to the client device after the bootstrapping process.

In one embodiment, the bootstrap data includes a meta table (i.e., a metadata tables or M-Table), and both the bootstrap data and the bootstrap database structure of the meta table are included in the bundle index file. M-tables are tables that cannot be tiled or were chosen not to be downloaded on demand. By way of example, M-tables may be tables without clear bundling key, small tables (for example less than 10 kb), etc. M-tables are available for the client applications right after building block bootstrapping. This strategy is usually used for small tables or tables with high reuse factor. The structure of M-table is created and filled with data during bootstrap. M-tables shall be used with caution as they negatively affect the duration of the database bootstrap.

In another embodiment, the bootstrap data includes a lazy table (loaded on demand) or "L-Table", and only the bootstrap database structure of the lazy table is included in the bundle index file. L-tables are tables that cannot be tiled or were chosen to be downloaded on demand completely. Lazy table is an intermediate strategy between M-table completely filled during the bootstrap and T-table, filled on demand. The L-table structure is created during bootstrap and filled with data on the first request. By way of example, L-tables may be tables without clear bundling key or small tables (less than 10 kb). L-tables can be downloaded on demand via NDS Streaming Client API.

By way of example, there are tiled tables ("T-Tables"), and range tile tables ("R-Tables"). T-tables have clear bundling keys and 1-1 key to bundle row relation. R-tables are tables have clear bundling keys and 1-N key to bundle row relation. T-table/R-table structure is created during bootstrap yet populated with content on demand based on the tiling schema during the streaming. The tiling scheme allows for sequential tile IDs to be adjacent to each other. As such, when tile bundles are created, the bundling will contain the tiles most likely to be used next (since a vehicle unlikely jumps to different locations but travel from one tile adjacent to the next). In one embodiment, content of T-tables and/or R-tables can be downloaded on demand via NDS Streaming Client API.

In one embodiment, in step 303, the bundling module 201 process the plurality of data records to generate a plurality of data bundle entries for an after-processing bundle block. Each of the data bundle entries corresponds to a subset of the tiles, and the after-processing bundle block includes a bundle file that includes content data of the data bundle entries and a bundle index file that includes metadata of the data bundle entries. By way of example, the bundling module 201 uses Map Bundling to creates bundle block files from the original NDS database. Each bundle block consists of Bundle Entries—abstract addressable binary blobs that contain a set of bundle rows from Bundle Tables content. Bundle table type is configurable and can be changed in a configuration file (or Config file) in case of changes in the users access patterns, NDS Format schemas, etc. In one embodiment, all original NDS building blocks have post-processed analogs—Bundle Blocks. The Bundle Blocks include Bundle Entries containing Bundle Tables, such as M-tables, L-Tables, T-Tables, R-Tables, or a combination thereof. In another embodiment, most of original NDS building blocks have post-processed analogs, except for a couple of small blocks like ROOT.NDS.

Figure 4:
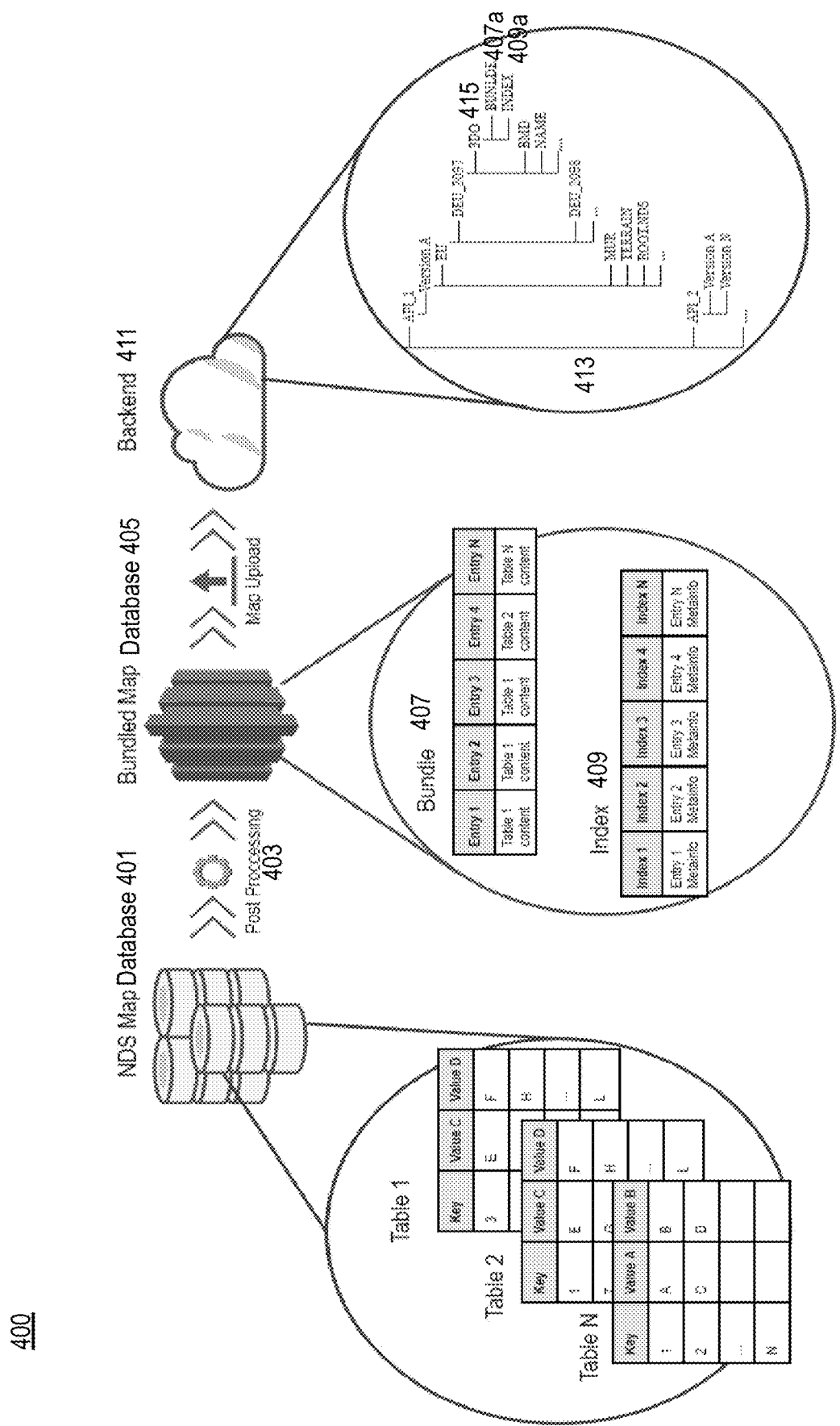
FIG. 4 is a diagram of a map bundling process 400, according to one embodiment.

By way of example, the bundling module 201 creates post-processed analogs (i.e. bundles) for the original NDS building blocks according to FIG. 4. FIG. 4 is a diagram of a map bundling process 400, according to one embodiment. The targets for bundling are SQLite Table 1-Table N of the NDS map database 401. Via a Post Processing 403, the bundling module 201 can filter and aggregate SQLite table data of smaller chunks from the original NDS building blocks into a bundled map database 405, using unique identifiers—tile ids, SQLite ids, etc., to archive a desired granularity. For each bundle 407, the bundling module 201 creates an index file 409 to look up for map data. For instance, the bundle 407 includes Entry 1 to Entry N each of which includes one or more portions of the content data (e.g., keys/IDs and values) in SQLite Table 1-Table N of the NDS map database 401, while the index file 409 includes Index 1 to Index N each of which includes the corresponding metadata ("MetaInfo") of Entry 1 to Entry N.

The post-processed map, i.e., the bundled map database 405, has a folder structure 413 similar to an original NDS folder structure except replacing each original NDS file is replaced with a folder 415 (e.g., a "3D0" folder) that contains a bundle 407a and an index files 409a. In one embodiment, the communication module 203 uploads the bundled map database 405 to a backend 411 (e.g., a streaming server) that supports range requests, for example, addressed to a file system folder or an HTTP server. In one embodiment, the bundling module 201 creates bundles for most of the original NDS building blocks, except for a couple of small blocks like ROOT.NDS.

Figure 5A:
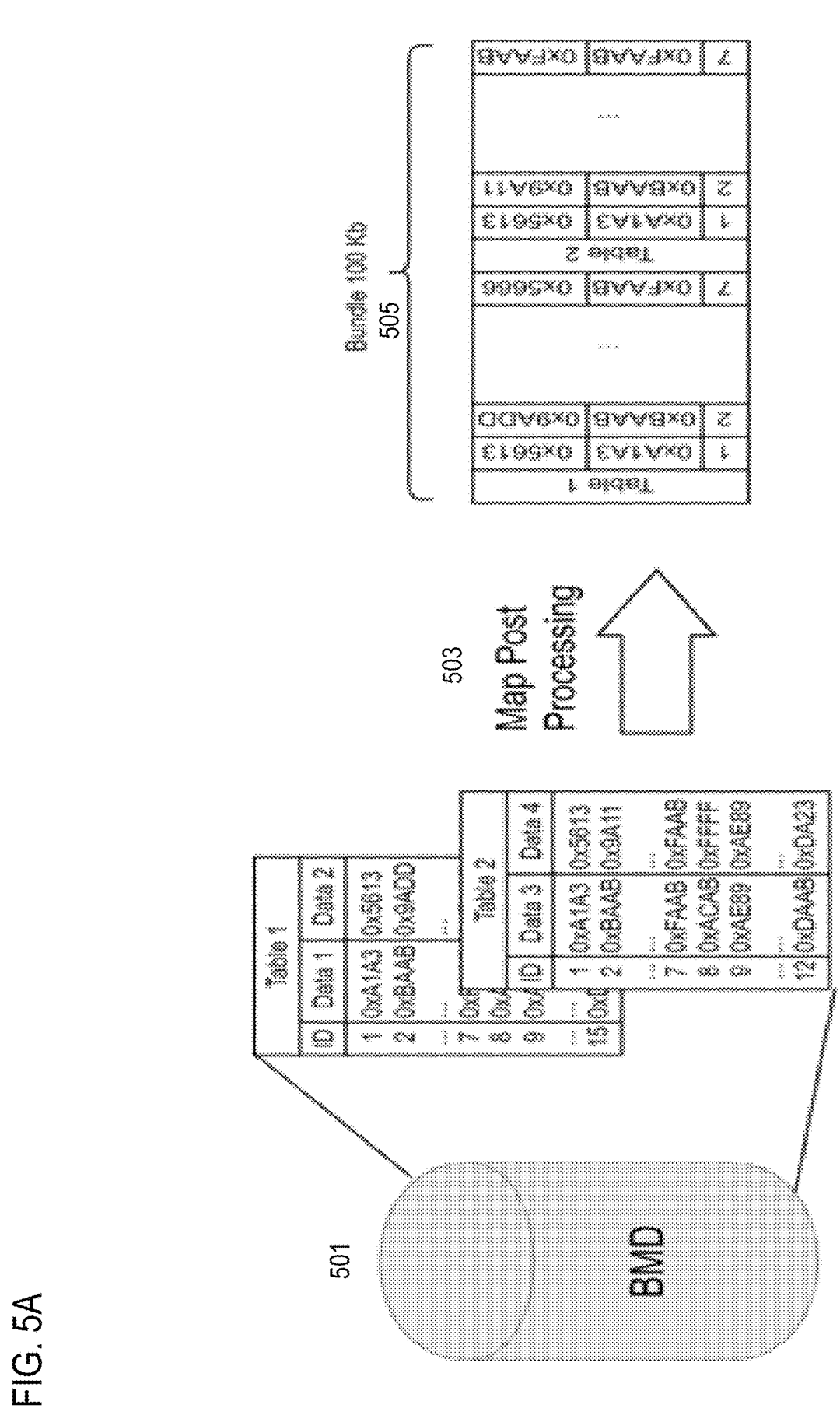
FIGS. 5A-5B are diagrams of a bundle and an index file, according to one embodiment.
Figure 5B:
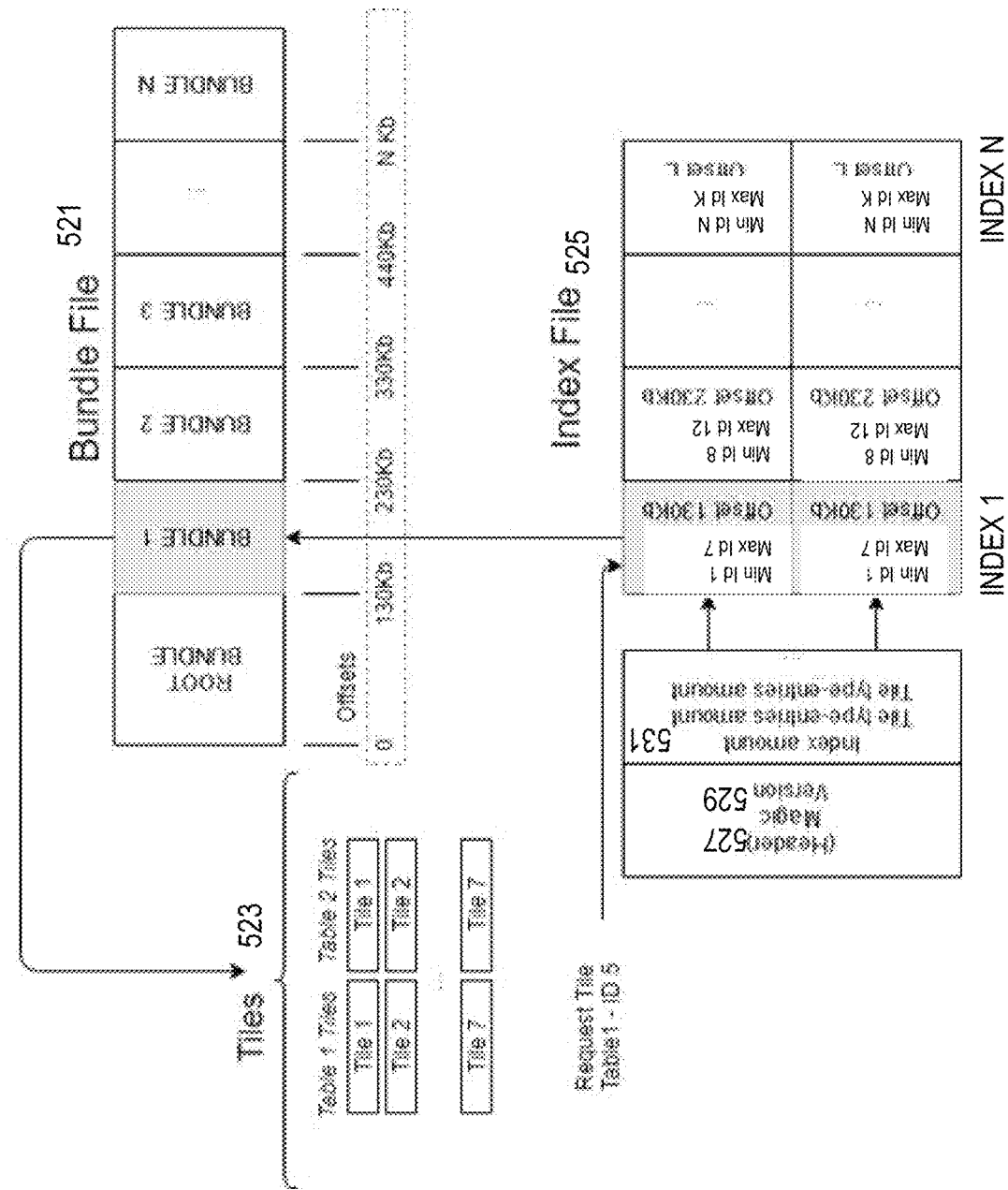

A pair of Bundle Block and Bundle index contain all necessary information for streaming one NDS building block. Different bundling strategies can be used depending on the original content and access patterns. FIGS. 5A-5B are diagrams of a bundle file and an index file, according to one embodiment. To reduce a number of requests and increase pre-fetching, tiles are merged into Bundle Entries. In FIG. 5A, the bundling module 201 creates from a Building Block 501, e.g., a Basic Map Display (BMD) building block, via a post processing 503, by bundling content data of Entry 1-Entry 7 of Table 1 (e.g., "0xA1A3", "0x5613", etc.) and content data of Entry 1-Entry 7 of Table 2 into a bundle entry 505 of a size 100 Kb (For example). In one embodiment, the bundles entries in a bundle file are of a static length (e.g., 100 Kb), to simply the data processing and increase efficiency. In other embodiments, the bundle entries in a bundle file may have various lengths to accommodate network speeds, download quota, local storage space, user navigation history, etc., thus incurring complex processing. In FIG. 5B, the bundle 505 constitutes Bundle 1 of a Bundle file 521. The Bundle file 521 includes bundle entries 1-N of the same size of 100 Kb.

In FIG. 5B, Bundle 1 contain the tile content data from Entry 1-Entry 7 of Table 1 and Table 2 corresponding to Tile 1-Tile 7 along the route of interest among Tile Tables 523. An index file 525 includes a header 527 and Index 1 to Index N corresponding to metadata ("MetaInfo") of Bundle 1 to Bundle N. The header 527 includes a magic version 529 and metadata of index amounts 531 ("Tile type-Entry Amount", etc.). Each of Index 1 to Index N includes an ID range and an offset value. In one embodiment of L-tables bundling, all bundle rows from L-table are combined into one bundle entry, to improve compression ratio.

In one embodiment of R/T-tables bundling, bundle rows from R/T-tables that are used together are merged into one bundle entry, to eliminate number of requests and increase content pre-fetching. For additional optimization, content of different R/T-tables could be merged into one bundle entry, i.e., cross table bundling. In another embodiment of R/T-tables bundling, R-table and T-table bundled separately (into one bundle entry) because of different content access patterns.

In one embodiment of Mixed Bundling, commonly used bundle rows can be moved to M-table or L-table bundle entries while other content is available as R-table or T-table bundle entries. In another embodiment of Mixed Bundling, a part of a L-table is downloaded before R-table or T part firstly accessed.

In one embodiment of Virtual Bundling, NDS Format contains SQLite tables with normalized and non-tile-related content, to reduce a map size. For example, poiTable and namedObjectTable contain only unique records that are unrelated to a point of interest and a namedOject geo-location, while redundant content is removed there from. The size of these records thus becomes relatively small. For example, average POI entry size is 227 bytes per record, which means that a network or file system should request 227 bytes per request. This leads to a significant performance overhead and a low compression ratio. To handle this problem, the bundling module 201 merges records into bundle entries, such that the non-tileable table content is normalized and not geo-related. In one embodiment, the bundling module 201 creates virtual geo-tiles and binds normalized content to a geo location. As a result, every POI request, the user gets no redundant content, which reduces data usage overhead. The denormalization in the client device may increase overall data usage, but reducing streaming activities. Another disadvantage of Virtual Bundling is that virtual tiles can be downloaded before the user accesses the original content which contains references to normalized content.

In one embodiment of NamedObjectTable Bundling, there are two stages. In the first stage, the bundling module 201 uses a post-processing tool collects all the references to namedObjectIds from bmdTIleTable, routingGeoTile, and other dependent tables. In other words the bundling module 201 creates a fake virtual geo tile which contains all the references from other tiles. In the seconds stage, the bundling module 201 uses the post-processing tool to reduce overall data usage overhead, via finding commonly used namedObjectIds, like coffee, park, street, etc., and moving them to a fake M-Table which is available after a NAME bundle block bootstrap. In the second stage, the bundling module 201 adds a set of namedObjectIds without references to the fake M-Table.

In one embodiment of poiTable Bundling, a poiVirtualTileTable is used to find references and create virtual tiles with POIs. A PoiTable content is available after user accesses poiVirtualTileTable through a Streaming Client API.

In one embodiment of N-Way Bundling, the Bundle format supports multiple bundling ways to allow complex access patterns for users. By way of example, apoiTable can be bundled twice. The first time, the poiTable can be bundled with a virtual tile approach, to speed-up rendering drawing performance. The second time, the poiTable can be bundled using its poiId as a bundling key. In other words, there are two instances of the same poiTable yet with different interpretations.

In one embodiment, the bundling module 201 use a Bundle format to store NDS content in an optimized way to be downloaded on demand. Such Bundle format has two main parts: metadata and binary data, and the Bundle format uses the following Bundle Description Format (BDF) to describe the layout. Table 1 specifies example rules describing entities presented in the BEF.

TABLE 1

1.1. Unions
BDF uses unions to describe variables that can have different types.
Unlike C/C++, BDF doesn't guarantee enough memory to present fields in a union. It only states that a filed may have different types:
    // Definition of new union
        #<Name Of union>    // # - new type definition operator
            <Field Name> : <Field Type A>:<Field Type B>:<Field Type C>
    // Union examples
    /// Definition example
        #FooAndBarUnion    // Definition of new FooAndBarUnion union
            value: FooType:BarType  // Variable in the structure
    /// Usage example
        fooValue FooType
        barValue BarType
        container FooAndBarUnion  // Created an instance of FooAndBarContainer
        container.value = fooValue
        container.value = barValue // Changed a structure field
1.2. Generic types
BDF uses a set of common types that build on top of Byte type - a simple type that represents byte.
1.2.1. Size-optimized integer
Size-optimized integers VarInt, VarUInt are represented as Byte arrays with dynamic size. The size depends on the integer value:

TABLE 1-continued

```
        #VarInt // dynamic bytes array that represents signed integer,
                // array length depends on integer value
            value : Byte[1-9]
    #VarUInt // dynamic bytes array that represents unsigned integer,
                // array length depends on integer value
            value : Byte[1-9]
    1.2.2. Magic
    Magic is a special fixed set of char constants to track and verify format validity:
        #Magic       // 4-bytes array that contains label to verify format
            value : Byte[4] // Magic value, e.g., "INDX", "TILE" etc.
    1.2.3. Compression
    Compression is a special type to describe compression:
        #Compression // Represents one of the following values {None=0, BZip2=1, Lzma=2}
            value : VarUInt
    1.2.4. Version
    Version is a special type to describe current bundle format version:
        #Version // Streaming client version representation
            value : VarUInt
    1.2.5. Other content types
    Other types used to store map content:
        #String // where Size is length of bytes array which represents content,
                // and Content is string content
            size : VarUInt
            content : Byte[Size]
        #Blob // where Size is length of bytes array which represents content
                // and Content is blob content
            size : VarUInt
            content : Byte[Size]
        #Double // Binary presentation of double
            bytes : Byte[8]
    1.2.6. SQLiteVar
    SQLiteVar is a BDF union that supports all built-in SQLite types and stores SQLite
    column content:
        #SQLiteVar // union value type depends on SQLite schema
            value : Double:VarInt:VarUInt:Blob:String
    2. Bundling Information
    Metadata binds SQLite schema and bundle format. It contains mapping between SQLite
    tables and bundle tables, and rules how to bundle SQLite tables.
    Metadata has 2 main files : map_schema and metadata.json. Files are available right
    after streaming map has been bootstrapped.
    2.1. metadata.json
    metadata.json is a JSON file that describes rules for bundling SQLite tables.
        {
            "<BUILDING_BLOCK_NAME>": {
                "priority": PRIORITY_VALUE,
                "lazy": [{
                    "table": "<SQLITE_TABLE_NAME>",
                    "id": UNIQUE_ID_OF_SQLITE_TABLE
                },{
                .......
                }],
                "range-tilable": [
                ...............
                ],
                "tilable": [
                ............
                ]
            },
            "<ANOTHER_BUILDING_BLOCK_NAME>": ....
        }
    Example of format for POI building block :
        {
            "POI": {
                "priority": 5,
                "lazy": [{
                    "table": "poiGeoLineAccessTable",
                    "id": 86
                }, {
                    "table": "poiIconTextureMapTable",
                    "id": 92
                }, {
                    "table": "poiAttrValueIconTable",
                    "id": 67
                }, {
                    "table": "poiIconTemplateTable",
                    "id": 91
                }, {
                    "table": "poiExtIntersectionAccessTable",
                    "id": 82
                }, {
```

TABLE 1-continued

```
        "table": "poiExtLinkAccessTable",
        "id": 84
}, {
        "table": "poiAgoraCAccessTable",
        "id": 64
}, {
        "table": "poiOpenLRAccessTable",
        "id": 99
}, {
        "table": "poiAttrNameStringCollTable",
        "id": 65
}, {
        "table": "poiExtGeoLineAccessTable",
        "id": 81
}, {
        "table": "poiLinkAccessTable",
        "id": 95
}, {
        "table": "poiAttrToNameStringCollTable",
        "id": 66
}, {
        "table": "poiGlobalIdAccessTable",
        "id": 87
}, {
        "table": "poiIconSpriteTable",
        "id": 90
}, {
        "table": "poiIntersectionAccessTable",
        "id": 93
}, {
        "table": "poiLaneAccessTable",
        "id": 94
}, {
        "table": "poiNamedObjectRelationTable",
        "id": 97
}, {
        "table": "poiNamedObjectToCatTable",
        "id": 98
}, {
        "table": "poiScaleLevelTable",
        "id": 102
}, {
        "table": "poiExtLaneAccessTable",
        "id": 83
}, {
        "table": "poiGeoAccessTable",
        "id": 85
}, {
        "table": "poiRelationTable",
        "id": 100
}],
"meta": [{
        "table": "poiCatCollectionTable",
        "id": 69
}],
"range-tilable": [{
        "table": "poiCategoryTable",
        "id": 80,
        "column": "catCollectionId"
}, {
        "table": "poiIconSetTable",
        "id": 89,
        "column": "collectionId"
}, {
        "table": "poiCatRelationTable",
        "id": 77,
        "column": "catCollectionId"
}, {
        "table": "poiCatNameStringCollTable",
        "id": 75,
        "column": "nameStringCollectionId"
}, {
        "table": "poiCatToNameStringCollTable",
        "id": 79,
        "column": "catCollectionId"
}, {
        "table": "poiIconImageTable",
        "id": 88,
        "column": "iconId"
}],
```

TABLE 1-continued

```
            "tilable": [{
                "table": "poiNameStringCollTable",
                "id": 96,
                "column": "poiId"
            }, {
                "table": "poiTable",
                "id": 103,
                "column": "poiId"
            }, {
                "table": "poiCatToAttrTable",
                "id": 78,
                "column": "catCollectionId"
            }, {
                "table": "poiVirtualTileTable",
                "id": 105,
                "column": "tileId"
            }]
        }
    }
```

2.2. map_schema
map_schema is a file that contains SQLite schemas.
MapSchema
    header         : MapSchemaHeader
    blocksCount    : VarUInt
    globalBlocksCount : VarUInt
    blocksSchema   : BlockSchema[blocksCount + globalBlocksCount]

3. Building block bundle File

Bundle file consists of a number of generic data blocks - Bundle Entries.
Each bundle file has an index file next to it, defining data block offset and size inside the bundle.
Together they contain all the required information to stream one NDS building block:
    #BundleFile        // Index File description
        bundle_entries : BundleEntry[*] // Number of entries - depends on
                              // the size of the original NDS block 3.1. Bundle Entry description Bundle Entry is a generic container for streaming data:
    #BundleEntry
            magic : Magic = "TILE"
      tables_count : VarUInt      // Number of tables in the Bundle entry
          tables : TableContent[tables_count ] // Content of different tables in the
                           // Bundle entry 3.2. TableContent Table Content structure describes SQLite table content:
    #TableContent
        table_id : VarUInt  // Unique SQLite table ID
        row_count : VarUInt      // Number of Bundle rows
          rows : BundleRow[row_count] // Bundle Rows 3.3. Bundle Row Bundle Row is a generic container for SQLite row:
    #BundleRow
        null_columns_size : VarUInt      // Number of null_columns
           null_columns : VarUInt[null_columns_size] // Indexes of null columns
          sqlite_content : SQLiteVar[*]  // SQLite content,
                         // type and size depends on SQLite schema 4. Index File Index file accompanies bundle file and provides the "on demand" streaming capability.
It consists of a header which describes meta information, index entries which contain information about bundle entries and metadata which contains content of M-tables:
    #IndexFile // Index File description
            header : Index_Header
      index_entries : IndexEntry[header.entries_count]
            metadata : MetaData 4.1. Header layout :

Index header contains meta information of the index file:
    #IndexHeader
               index_magic : MAGIC = "INDX"
            current_version : Version
      index_file_compression : Compression
               entries_count: VarUInt     // number of index entries 4.2. Index Entry layout :

Index entry is a structure that describes Bundle Entry meta information:
    #IndexEntry
        from  : VarUInt // The smallest bundle key value in Bundle Entry
        to    : VarUInt // The largest bundle key value in Bundle Entry
        offset : VarUInt // Bundle Entry offset in bytes
        size  : VarUInt // Bundle Entry size in bytes TABLE 1-continued 4.3. Metadata
Metadata section contains all the necessary information for building block bootstrap :
    #MetaData
            meta_magic : MAGIC = "META"
        meta_tables_count : VarUInt      // Number of M-tables in Index file
                    tables : TableContent[meta_tables_count] // M-tables content The bundled map database may have a flat structure storing all bundles. A streaming server can be implemented in a cloud architecture. NDS Streaming using the described embodiments allow for use of relatively thin client hardware, to utilize a limited storage space and minimize communication costs thereof.

In one embodiment, in step 305, the bundling module 201 selects one of the data bundle entries based on a tile of interest in the request. In one embodiment, in step 307, the bundling module 201 generates a mapping data stream based on the selected data bundle entry. In one embodiment, in step 309, the communication module 205 initiates the streaming of the content data of the selected data bundle entry in response to the request. The content data of the selected data bundle entry is transmitted as a data block of the mapping data stream.

On the client side, the NDS Streaming is designed to work with a streaming platform/server/backend. In one embodiment, the streaming client provides on-demand access to map data (e.g., NDS data) while leaving the bundle structure transparent to the end user. The streaming client can reside in a user device the vehicle 103 and/or the UE 105.

The streaming client 113 supports a life-cycle with three stages: a Cold Start stage, Building Block Bootstrapping stage, and an Actual Streaming stage. In the Cold Start stage, no map data is available on the user device. Therefore, the streaming client 113 downloads all the necessary bootstrapping files, unpacks the files, and creates core map database structure (defined by user). In the Building Block Bootstrapping stage, upon a request for a building block, the streaming client 113 bootstraps the building block via downloading relevant Bundle Index, creating a database file for local caching on the device and optional metadata.

In one embodiment, the streaming client 113 determines that the extracted bootstrap data includes a meta table, creates database structure of the meta table during the bootstrap process, and fills the database structure with the extracted data during the bootstrap process. In another embodiment, the streaming client 113 determines that the extracted bootstrap data includes a lazy table, creates the database structure of the lazy table during the bootstrap process, and fills the database structure using on-demand data requested after the bootstrap process.

In the Actual Streaming stage, the streaming client 113 downloads map content data through the bundle file. A data block of the streaming database is subsequently requested on demand to fill the local database.

Figure 6:
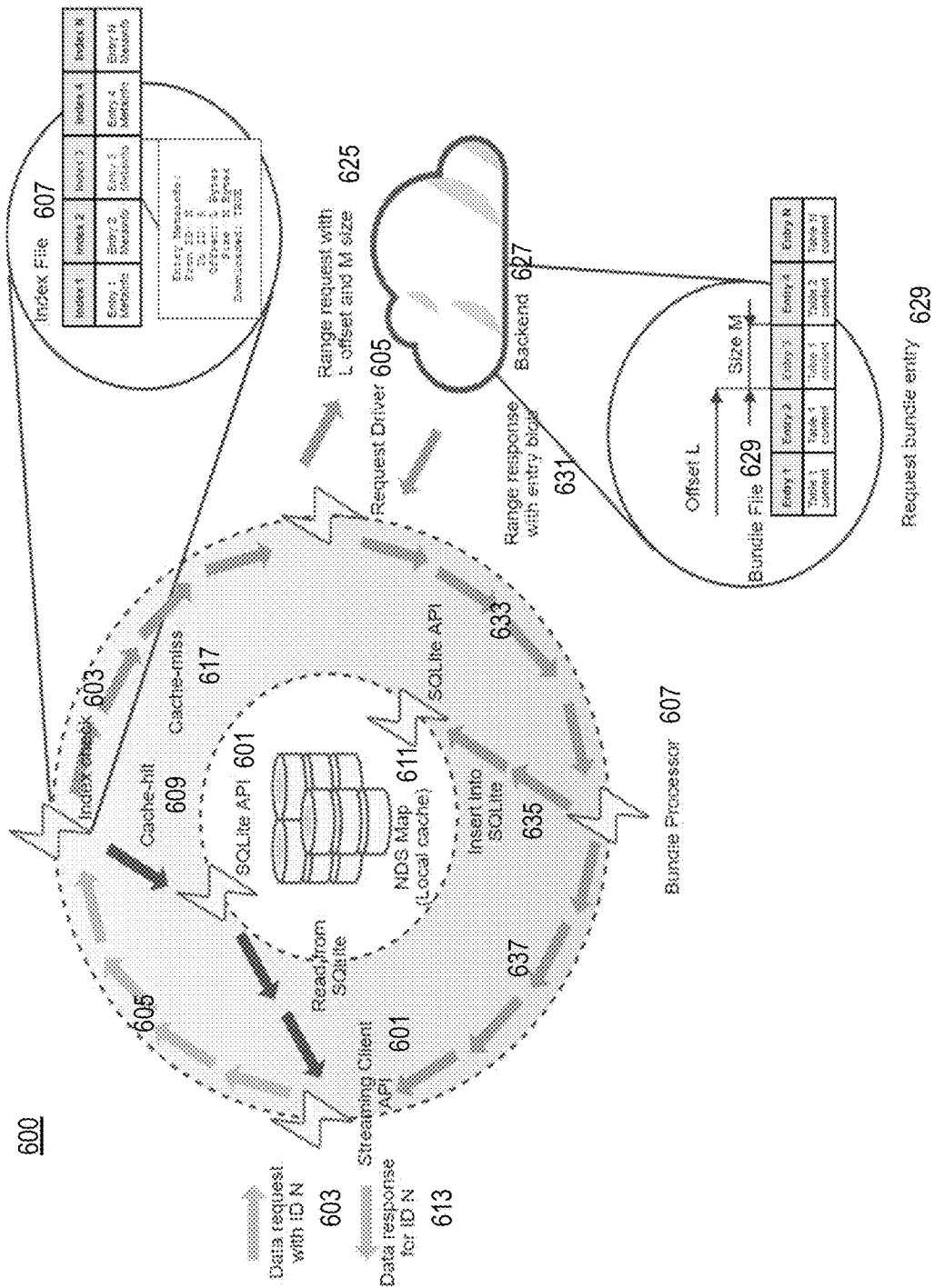
FIG. 6 is a diagram depicting a streaming process executed by a streaming client, according to one embodiment.

In another embodiment, FIG. 6 is a diagram depicting a streaming process executed by a streaming client, according to one embodiment. Based on the streaming process 600, a streaming client API 601 receives a data request 603 with an ID "N", and forwards the request 603 in Step 605 to an index checker. The index checker matches the ID "N" with Index 3 in the Index file 607, and the Index 3 specifies Entry 3: MetaInfo including From bundle block minimal tile ID "N" to bundle block maximum tile ID "K", a bundle block offset value of L bytes, a bundle block size of M bytes, and a downloaded indication of "TRUE" (i.e., the bundle block has already been downloaded in the client device). In response to the "cache hit" 609, the index checker forwards the processing of this request to SQLite API. The SQLite API 601 retrieves the requested data from NDS map (local cache) 611 and return to the client in Step 613.

On the other hand, when the index checker cannot match the ID "N" with any Index in the Index file 607, or the matched Index 3 has a downloaded indication of "FALSE" (i.e., the bundle block has not yet been downloaded in the client device). In response to the "cache miss" 617, the Request Driver creates a range request 625 (with L offset and M size), and sends the range request 625 to a backend server 627. The backend server 627 retrieves the bundle block from a bundled NDS map, based on L offset and M size and the corresponding bundle file 629, and sends a range response with bundle entry blob 631 to the Request Driver. The Request Driver forwards the range response with Bundle entry blob 631 to the Bundle Processor in Step 633. The Bundle Processor decompresses and decodes the bundle entry blob into raw NDS data (or other SQLite data) and sends the raw NDS Data to the SQLite API in Step 635. The SQLite API inserts the raw NDS Data into the NDS map (local cache) 611. In addition, the Bundle Processor sends the raw NDS Data to a streaming client API in Step 601. The streaming client API can then send a data response for the ID "N" 615 to present to the user.

NDS Streaming using the described approach allows for use of relatively thin client hardware, to utilize a limited storage space and minimize communication costs. The bundled map database 405, a streaming server, and/or the backend 411 may have a flat structure storing all bundles. While a streaming server can be implemented in a cloud architecture, the bundle approach could also be implemented in a client device (e.g., a mobile phone). By way of example, a smart phone may have larger storage capacities and can be easily transported to an area where WIFI (or other low cost wireless connections) can be established for downloading a full NDS database. Alternatively, tile bundles could reside on an external memory device (e.g., a SD card, a USB Memory stick, etc.) and be streamed to a streaming client application, rather than performing a full update of the database.

In another embodiment, the bundle approach supports a peer-to-peer scenario, where vehicles can exchange whichever map tile data bundles available locally. By way of example, vehicles form one or more ad-hoc networks (e.g., via V2V network protocols) and publish a manifest of their available bundles to the ad-hoc networks, allowing for other vehicles to request download of their bundles. In another embodiment, schemes like the Magnet URI scheme are deployed to aid in the publication and opportunistic download of map tile bundles.

Returning to FIG. 1, in one embodiment, the vehicles 103 and UE 105 of system 100 are part of the digital transportation infrastructure provided by the streaming platform 101. In other words, as previously described, the vehicles 103 and/or UE 105 are part of geographical data collection system that transmits or otherwise collects geographical data (e.g., geotagged data, incident reports, event reports, etc.) for processing by the streaming platform 101. In one embodiment, the streaming platform 101 has connectivity or access to a geographic database 111 that includes mapping data (e.g., including geotagged data at different resolutions) about a road network, including a tile projection of the mapping or geotagged data (additional description of the geographic database 111 is provided below with respect to FIG. 9). In one embodiment, the hierarchical resolution tile-based map representation generated according to the various embodiments described herein can also be stored in the geographic database 111 by the streaming platform 101 for distribution to end users. In addition or alternatively, the hierarchical tile-based map and/or related information can be stored by another component of the system 100 in the geographic database 111 for subsequent retrieval and processing by the streaming platform 101.

In one embodiment, the vehicles 103 and/or UEs 105 may execute software applications 113a-113n to query, present, or use the bundles generated by the streaming platform 101. For example, the applications 113 can include a navigation application then the streaming platform 101 can transmit or publish bundle data to the navigation application 113 in real time to provide better situational awareness when traveling in a road network. In one embodiment, the vehicles 103 receiving the tile-based map data can be autonomous or highly assisted driving vehicles which can use the geotagged data for calculating autonomous driving behavior or control of the vehicles 103. For example, the tile-based map data can be used to determine routing information, provide notifications of potentially problematic areas, and/or the like.

By way of example, the UE 105 is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 105 can support any type of interface to the user (such as "wearable" circuitry, etc.). In one embodiment, the UE 105 may be associated with a vehicle 103 (e.g., cars), a component part of the vehicle 103, a mobile device (e.g., phone), and/or a combination of thereof. Similarly, the vehicle 103 may include computing components that can be perform all or a portion of the functions of the UE 105. By way of example, the applications 113 may include any type of applications that are executable at the vehicle 103 and/or the UE 105, such as vehicle control application, mapping application, location-based service applications, navigation applications, content provisioning services, camera/imaging application, media player applications, social networking applications, calendar applications, and the like. In one embodiment, the applications 113 may act as a client for the streaming platform 101 and perform one or more functions of the streaming platform 101 alone or in combination with the streaming platform 101. In one embodiment, the vehicles 103 and/or the UEs 105 are configured with various sensors for generating or collecting the geographical data (e.g., including geotagged data). By way of example, the sensors may include, but is not limited to, ground-based LiDAR, global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture road sign information, images of road obstructions, etc. for analysis), an audio recorder for gathering audio data, velocity sensors mounted on steering wheels of the vehicles, switch sensors for determining whether one or more vehicle switches are engaged, and the like. Other examples of sensors of the vehicles 103 and/or UE 105 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the vehicle may detect the relative distance of the vehicle from lane or roadways, the presence of other vehicles, pedestrians, traffic lights, potholes and any other objects, or a combination thereof. In one scenario, the sensors may detect weather data, traffic information, or a combination thereof. In one example embodiment, the vehicles 103 and/or UE 105 may include GPS receivers to obtain geographic coordinates from satellites 115 for determining current location and time associated with the vehicle 103 and/or UE 105 for generating probe data. Further, the location can be determined by a triangulation system such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc. The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the streaming platform 101 may be a platform with multiple interconnected components. The streaming platform 101 may include multiple servers, intelligent networking devices, computing devices, components and corresponding software for providing trajectory bundles for map data analysis. In addition, it is noted that the streaming platform 101 may be a separate entity of the system 100, a part of the one or more services 117*a*-117*m* (collectively referred to as services 117) of the services platform 119, or included within the vehicle 103 and/or the UE 105.

The services platform 119 may include any type of service 117 configured to process or use tile-based map data provided by the streaming platform 101. By way of example, the services 117 may be third party services and include autonomous vehicle services, mapping services, navigation services, travel planning services, notification services, social networking services, content (e.g., audio, video, images, etc.) provisioning services, application services, storage services, contextual information determination services, location based services, information based services (e.g., weather, news, etc.), etc. In one embodiment, the services platform 119 may interact with the streaming platform 101, vehicles 103, and/or UE 105 to provide the services 117.

In one embodiment, content providers 121*a*-121*k* (collectively referred to as content providers 121) may provide content or data (e.g., including geographical data) to the vehicles 103 and/or UE 105, the streaming platform 101, and/or the services 117. The content provided may be any type of content, such as textual content, audio content, video content, image content, etc. In one embodiment, the content providers 121 may provide content that may aid in the detecting and classifying of traffic incidents and/or other location-based events indicated the geographical data received by the streaming platform 101. In one embodiment, the content providers 121 may also store content associated with the vehicles 103, the UE 105, the streaming platform 101, and/or the services 117. In another embodiment, the content providers 121 may manage access to a central repository of data, and offer a consistent, standard interface to data, such as a repository of geotagged data, tile-based map data, probe data, etc. Any known or still developing methods, techniques or processes for retrieving and/or accessing features for road links from one or more sources may be employed by the streaming platform 101.

By way of example, the streaming platform 101, vehicles 103, UE 105, the services platform 119, and the content providers 121 communicate with each other and other components of the system 100 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 7:
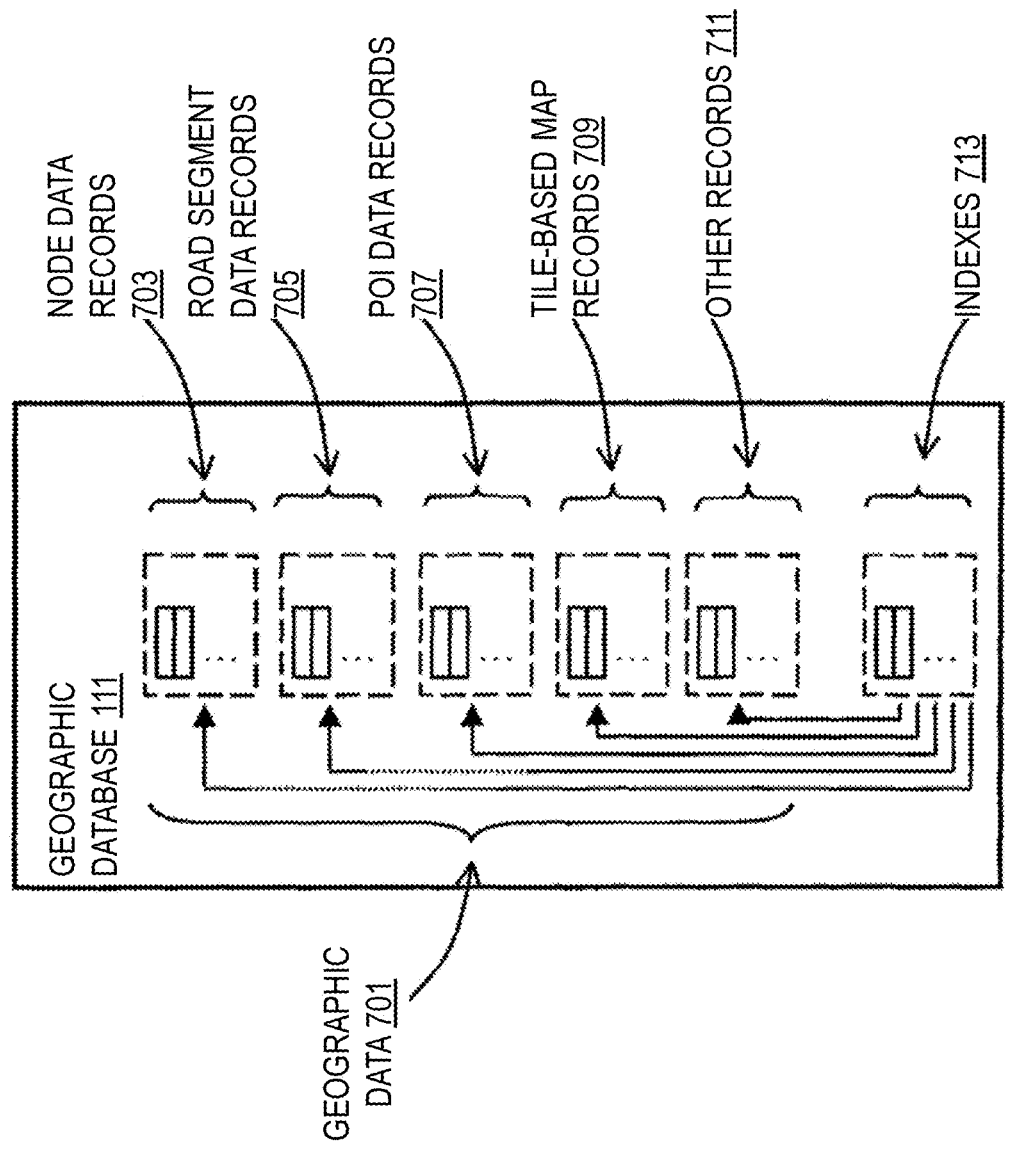
FIG. 7 is a diagram of a geographic database, according to one embodiment.

FIG. 7 is a diagram of the geographic database 111 of system 100, according to exemplary embodiments. In the exemplary embodiments, clustered geographical data can be stored, associated with, and/or linked to the geographic database 111 or data thereof. In one embodiment, the geographic database 111 includes geographic data 701 used for (or configured to be compiled to be used for) mapping and/or navigation-related services, such as for personalized route determination, according to exemplary embodiments. For example, the geographic database 111 includes node data records 703, road segment or link data records 705, POI data records 707, tile-based map records 709, other records 711, and indexes 713, for example. More, fewer or different data records can be provided. In one embodiment, additional data records (not shown) can include cartographic ("carto") data records, routing data, and maneuver data. In one embodiment, the indexes 713 may improve the speed of data retrieval operations in the geographic database 111. The indexes 713 may be used to quickly locate data without having to search every row in the geographic database 111 every time it is accessed.

In exemplary embodiments, the road segment data records 705 are links or segments representing roads, streets, or paths, as can be used in the calculated route or recorded route information for determination of one or more personalized routes, according to exemplary embodiments. The node data records 703 are end points corresponding to the respective links or segments of the road segment data records 705. The road link data records 705 and the node data records 703 represent a road network, such as used by vehicles, cars, and/or other entities. Alternatively, the geographic database 111 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 111 can include data about the POIs and their respective locations in the POI data records 707. The geographic database 111 can also include data about places, such as cities, towns, or other communities, and other geographic features, such as bodies of water, mountain ranges, etc. Such place or feature data can be part of the POI data records 707 or can be associated with POIs or POI data records 707 (such as a data point used for displaying or representing a position of a city).

In one embodiment, the geographic database 111 is presented according to a hierarchical or multi-level tile projection. Information related to this tile projection (e.g., hierarchical tile-based map data) is stored in the tile-based map records 709. More specifically, in one embodiment, the geographic database 111 may be defined according to a normalized Mercator projection. Other projections may be used. By way of example, the map tile grid of a Mercator or similar projection is a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom or resolution level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has 2(n+1) cells. Accordingly, any tile of the level (n) has a geographic area of A/2(n+1) where A is the total geographic area of the world or the total area of the map tile grid 10. Because of the numbering system, the exact position of any tile in any level of the map tile grid or projection may be uniquely determined from the tile ID.

In one embodiment, the system 100 may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one-dimensional array of the quadkey. In another example, the length of the one-dimensional array of the quadkey may indicate the corresponding level within the map tile grid 10. In one embodiment, the quadkey is an example of the hash or encoding scheme of the respective geographical coordinates of a geographical data point that can be used to identify a tile in which the geographical data point is located.

In one embodiment, the tile-based map records 709 also store the hierarchical tile-based map generated according to the various embodiments described herein. In one embodiment, the streaming platform 101 provides the tile-based data records 709 to support real-time or substantially real-time distribution of the hierarchical tile-based map data (e.g., for autonomous vehicle operation). In one embodiment, real-time or substantially real-time refers to generating an output (e.g., a distribution of the tile-based map data) within a predetermined period of time from receiving an input (e.g., an elevation query). This predetermined period can be configured from milliseconds to seconds to minutes or more of the data collection depending on how the system 100 is configured to indicate a real-time or substantially real-time scale.

In one embodiment, the geographic database 111 can be maintained by the content provider 121 in association with the services platform 119 (e.g., a map developer). The map developer can collect geographic data to generate and enhance the geographic database 111. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 111 can be a master geographic database stored in a format that facilitates updating, maintenance, and development. For example, the master geographic database 111 or data in the master geographic database 111 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as autonomous vehicle operation, route calculation, route guidance, map display, speed calculation, distance and travel time functions, and other functions, by a navigation device, such as by a vehicle 103 or UE 105, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 111 can be a master geographic database, but in alternate embodiments, the geographic database 111 can represent a compiled navigation database that can be used in or with end user devices (e.g., vehicle 103, UE 105, etc.) to provide navigation-related functions. For example, the geographic database 111 can be used with the end user device to provide an end user with navigation features. In such a case, the geographic database 111 can be downloaded or stored on the end user device (e.g., vehicle 103, UE 105, etc.), such as in applications 113, or the end user device can access the geographic database 111 through a wireless or wired connection (such as via a server and/or the communication network 107), for example.

In one embodiment, the end user device can be an in-vehicle navigation system, an autonomous vehicle control system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device (e.g., UE 105) can be a cellular telephone. An end user can use the device navigation functions such as guidance and map display, for example, and for determination of route information to at least one identified point of interest, according to exemplary embodiments.

The processes described herein for streaming map data based on data types may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
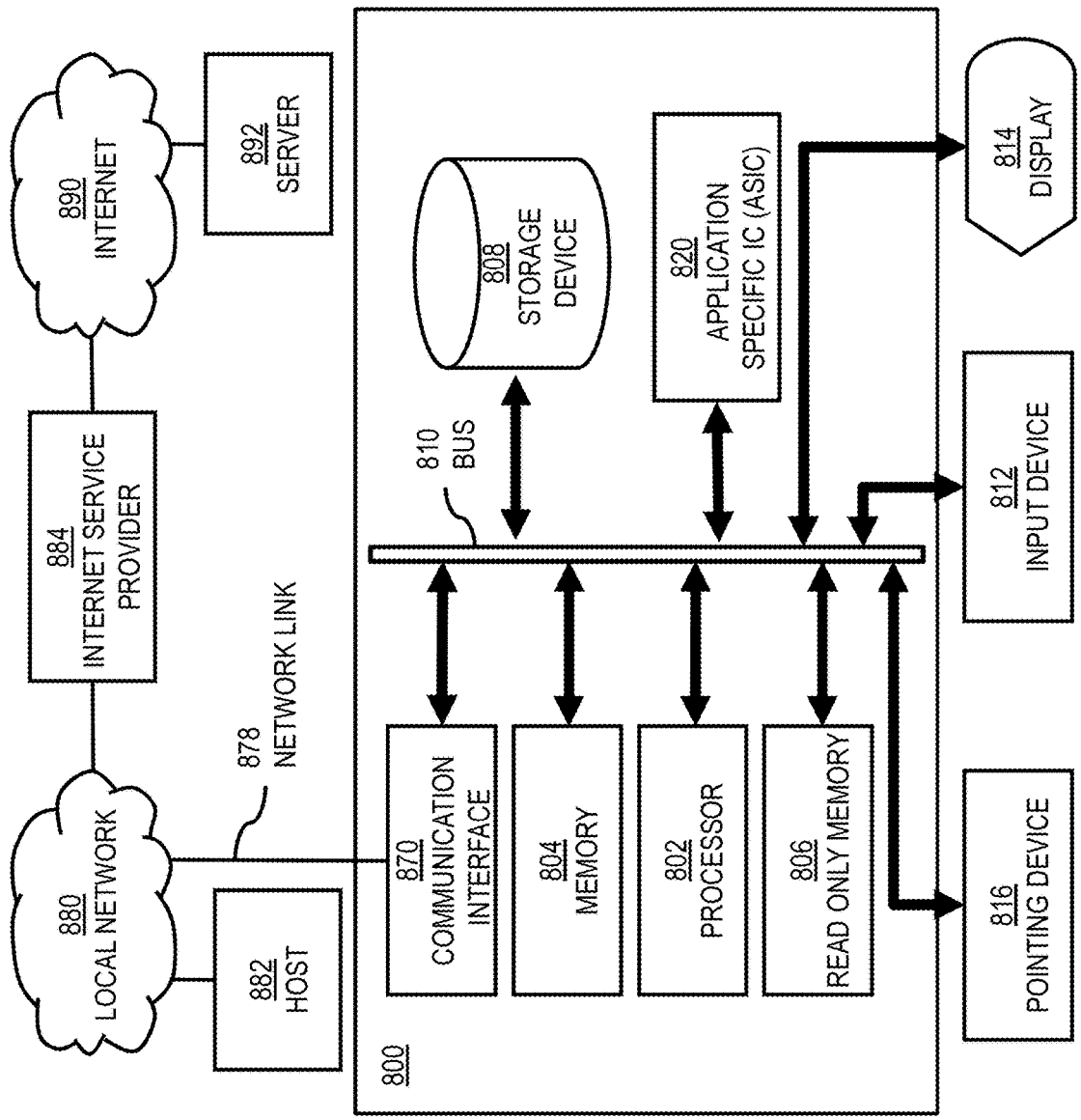
FIG. 8 is a diagram of hardware that can be used to implement an embodiment of the invention.

FIG. 8 illustrates a computer system 800 upon which an embodiment of the invention may be implemented. Computer system 800 is programmed (e.g., via computer program code or instructions) to stream map data based on data types as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 810 includes one or more parallel conductors of information so that information is transferred quickly among devices coupled to the bus 810. One or more processors 802 for processing information are coupled with the bus 810.

A processor 802 performs a set of operations on information as specified by computer program code related to streaming map data based on data types. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or other dynamic storage device, stores information including processor instructions for streaming map data based on data types. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for streaming map data based on data types, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT) or a liquid crystal display (LCD), or plasma screen or printer for presenting text or images, and a pointing device 816, such as a mouse or a trackball or cursor direction keys, or motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 for streaming map data based on data types to the UE 101.

The term computer-readable medium is used herein to refer to any medium that participates in providing information to processor 802, including instructions for execution. Such a medium may take many forms, including, but not limited to, non-volatile media, volatile media and transmission media. Non-volatile media include, for example, optical or magnetic disks, such as storage device 808. Volatile media include, for example, dynamic memory 804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system can be deployed in various configurations within other computer systems, e.g., host 882 and server 892.

FIG. 9 illustrates a chip set 900 upon which an embodiment of the invention may be implemented. Chip set 900 is programmed to stream map data based on data types as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to stream map data based on data types. The memory 905 also stores the data associated with or generated by the execution of the inventive steps.

Figure 10:
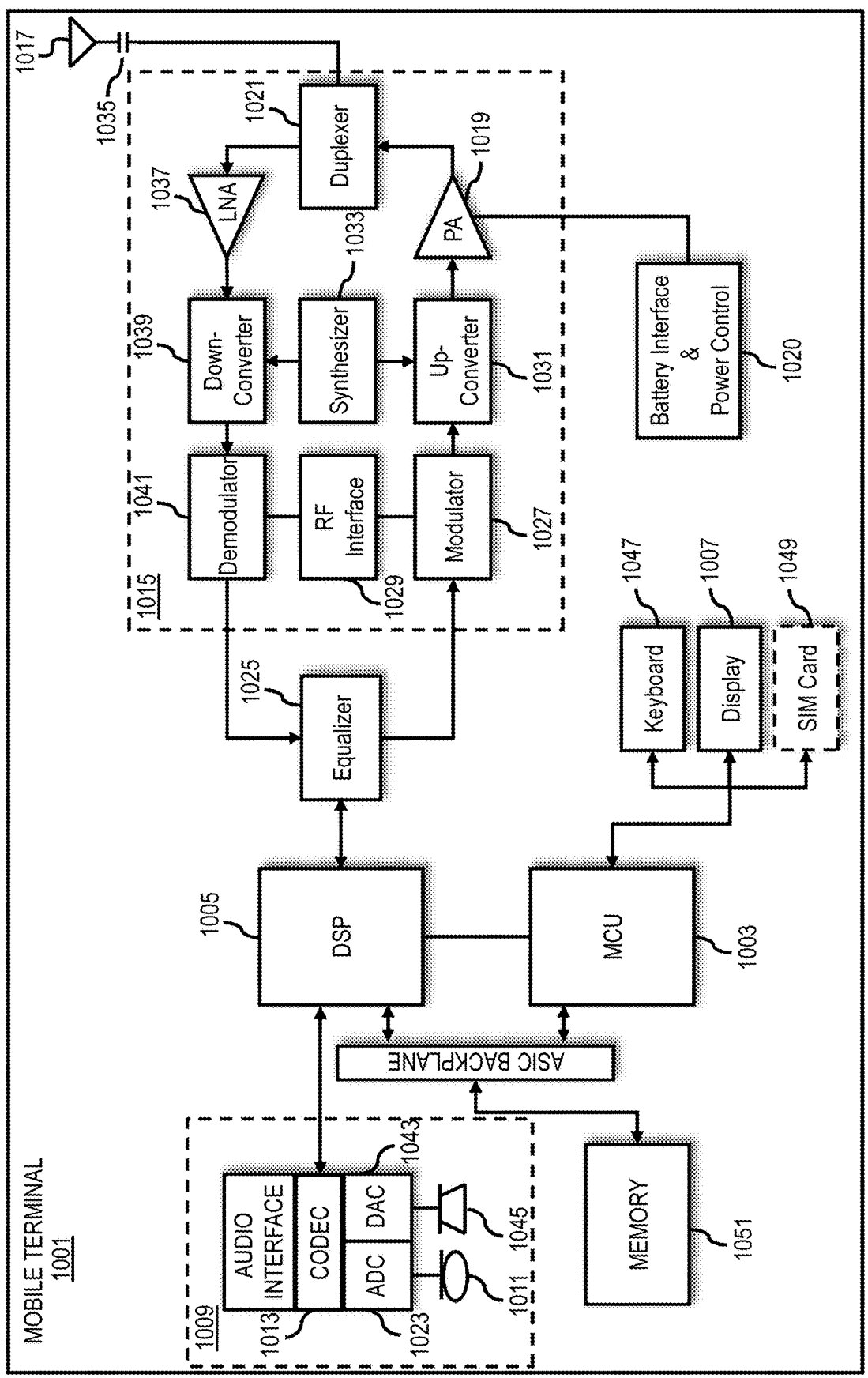
FIG. 10 is a diagram of a mobile terminal (e.g., handset) that can be used to implement an embodiment of the invention.

FIG. 10 is a diagram of exemplary components of a mobile terminal (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile station functions that offer automatic contact matching. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile station 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003—which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile station 1001 to stream map data based on data types. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the station. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile station 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1051 may be, but not limited to, a single memory, CD, DVD, ROM, RAM, EEPROM, optical storage, or any other non-volatile or non-transitory storage medium capable of storing digital data.

An optionally incorporated SIM card 1049 carries, for instance, important information, such as the cellular phone number, the carrier supplying service, subscription details, and security information. The SIM card 1049 serves primarily to identify the mobile station 1001 on a radio network. The card 1049 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving a request to initiate a streaming of a mapping database to a client device, wherein the mapping database includes at least one original data block that includes a plurality of data records corresponding to a plurality of tiles;
   processing the plurality of data records to generate a plurality of data bundle entries for an after-processing bundle block, wherein each of the data bundle entries corresponds to a subset of the tiles, and the after-processing bundle block includes a bundle file that includes content data of the data bundle entries and a bundle index file that includes metadata of the data bundle entries;
   selecting one of the data bundle entries based on a tile of interest in the request;
   generating a mapping data stream based on the selected data bundle entry; and
   initiating the streaming of the content data of the selected data bundle entry in response to the request,
   wherein the content data of the selected data bundle entry is transmitted as a data block of the mapping data stream.

2. The method of claim 1, wherein the request is initiated via an application on the client device, and the method further comprising:
   initiating a startup of the application via transmitting bootstrap data to the client device, wherein the bootstrap data includes bootstrap database structure information in the bundle index files of the data bundle entries.

3. The method of claim 2, further comprising:
classifying the bootstrap data as a meta table, wherein the client device creates a local copy of the bootstrap database structure of the meta table and fills the local copy with the bootstrap data of the meta table during a bootstrap process of the streaming of the mapping database.

4. The method of claim 3, wherein the meta table has a table size below a size threshold, a reuse factor above a reuse threshold, or a combination thereof.

5. The method of claim 1, further comprising:
further classifying the bootstrap data as a lazy table, wherein only the bootstrap database structure of the lazy table is included in the bootstrap data.

6. The method of claim 5, wherein the client device creates a local copy of the bootstrap database structure of the lazy table and fills the local copy with the bootstrap data of the lazy table on demand after a bootstrap process of the streaming of the mapping database.

7. The method of claim 1, wherein the original data block includes a plurality of data rows of one or more data tables of the mapping database, and wherein the processing includes classifying of each data record with respect to each row of the plurality of data rows.

8. The method of claim 1, wherein the bootstrap data is non-tileable data.

9. The method of claim 8, wherein the non-tileable data is not geo-referenced to a map tile of the mapping database.

10. The method of claim 1, wherein the content data of the selected data bundle entry is tileable data, and the tileable data is geo-referenced to the map tile of the mapping database.

11. An apparatus comprising:
at least one processor; and
at least one memory including computer program code for one or more programs,
the at least one memory and the computer program code configured to, with the at least one processor, cause the apparatus to perform at least the following,
receive a request to initiate a streaming of a mapping database to a client device, wherein the mapping database includes at least one original data block that includes a plurality of data records corresponding to a plurality of tiles;
process the plurality of data records to generate a plurality of data bundle entries for an after-processing bundle block, wherein each of the data bundle entries corresponds to a subset of the tiles, and the after-processing bundle block includes a bundle file that includes content data of the data bundle entries and a bundle index file that includes metadata of the data bundle entries;
select one of the data bundle entries based on a tile of interest in the request;
generate a mapping data stream based on the selected data bundle entry; and
initiate the streaming of the content data of the selected data bundle entry in response to the request,
wherein the content data of the selected data bundle entry is transmitted as a data block of the mapping data stream.

12. The apparatus of claim 11, wherein the request is initiated via an application on the client device, and the apparatus is further caused to:

initiate a startup of the application via transmitting bootstrap data to the client device,
wherein the bootstrap data includes bootstrap database structure information in the bundle index files of the data bundle entries.

13. The apparatus of claim 12, wherein the apparatus is further caused to:
classify the bootstrap data as a meta table, wherein the client device creates a local copy of the bootstrap database structure of the meta table and fills the local copy with the bootstrap data of the meta table during a bootstrap process of the streaming of the mapping database.

14. The apparatus of claim 13, wherein the meta table has a table size below a size threshold, a reuse factor above a reuse threshold, or a combination thereof.

15. The apparatus of claim 12, wherein the apparatus is further caused to:
further classify the bootstrap data as a lazy table,
wherein only the bootstrap database structure of the lazy table is included in the bootstrap data.

16. A non-transitory computer readable storage medium carrying one or more sequences of one or more instructions which, when executed by one or more processors, cause an apparatus to perform:
receiving a request to initiate a streaming of a mapping database to a client device, wherein the mapping database includes at least one original data block that includes a plurality of data records corresponding to a plurality of tiles;
processing the plurality of data records to generate a plurality of data bundle entries for an after-processing bundle block, wherein each of the data bundle entries corresponds to a subset of the tiles, and the after-processing bundle block includes a bundle file that includes content data of the data bundle entries and a bundle index file that includes metadata of the data bundle entries;
selecting one of the data bundle entries based on a tile of interest in the request;
generating a mapping data stream based on the selected data bundle entry; and
initiating the streaming of the content data of the selected data bundle entry in response to the request,
wherein the content data of the selected data bundle entry is transmitted as a data block of the mapping data stream.

17. The non-transitory computer readable storage medium of claim 16, wherein the request is initiated via an application on the client device, and the apparatus is caused to further perform:
initiating a startup of the application via transmitting bootstrap data to the client device,
wherein the bootstrap data includes bootstrap database structure information in the bundle index files of the data bundle entries.

18. The non-transitory computer readable storage medium of claim 17, wherein the apparatus is caused to further perform:
classifying the bootstrap data as a meta table, wherein the client device creates a local copy of the bootstrap database structure of the meta table and fills the local copy with the bootstrap data of the meta table during a bootstrap process of the streaming of the mapping database.

19. The non-transitory computer readable storage medium of claim 18, wherein the meta table has a table size below a size threshold, a reuse factor above a reuse threshold, or a combination thereof.

20. The non-transitory computer readable storage medium of claim 16, wherein the apparatus is caused to further perform:
  further classifying the bootstrap data as a lazy table, wherein only the bootstrap database structure of the lazy table is included in the bootstrap data.

* * * * *